(12) United States Patent  
Watanabe

(10) Patent No.: US 9,706,250 B2  
(45) Date of Patent: Jul. 11, 2017

(54) DATACAST INFORMATION CONTROLLER, DATACAST INFORMATION DISPLAY SYSTEM, DATACAST INFORMATION CONTROL METHOD AND COMPUTER-READABLE RECORDING MEDIUM

(71) Applicant: NEC Corporation, Minato-ku, Tokyo (JP)

(72) Inventor: Go Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/728,041

(22) Filed: Jun. 2, 2015

(65) Prior Publication Data

US 2015/0358678 A1    Dec. 10, 2015

(30) Foreign Application Priority Data

Jun. 6, 2014 (JP) ................. 2014-117754

(51) Int. Cl.

| | | |
|---|---|---|
| *H04N 7/10* | (2006.01) | |
| *H04N 7/025* | (2006.01) | |
| *H04N 7/173* | (2011.01) | |
| *H04N 7/16* | (2011.01) | |
| *H04N 21/435* | (2011.01) | |

(Continued)

(52) U.S. Cl.  
CPC ......... *H04N 21/435* (2013.01); *H04N 21/488* (2013.01); *H04N 21/8405* (2013.01)

(58) Field of Classification Search  
USPC .................... 725/32, 105, 135–137  
See application file for complete search history.

(56) References Cited

U.S. PATENT DOCUMENTS

| 9,246,823 B1* | 1/2016 | Sukonik ................. H04L 47/20 |
|---|---|---|
| 2006/0136983 A1* | 6/2006 | Bae ........................ H04H 20/28 |
| | | 725/136 |

(Continued)

FOREIGN PATENT DOCUMENTS

| JP | 2006-033574 A | 2/2006 |
|---|---|---|
| JP | 2009296418 A | 12/2009 |
| JP | 2013223093 A | 10/2013 |

*Primary Examiner* — Nasser Goodarzi  
*Assistant Examiner* — Fred Peng

(57) ABSTRACT

Disclosed is that datacast information from at least one or more broadcast station is searched for information that a user wants to view and searched information is presented to the user in a manner desired by the user. A datacast information controller includes a content storage unit storing datacast information obtained by splitting a broadcast radio wave, a keyword comparison unit determining whether the datacast information includes a specified keyword, a broadcast information storage unit storing datacast information that includes the keyword detected beforehand, a broadcast information comparison unit comparing datacast information determined to include the keyword with datacast information being stored in the broadcast information storage unit and including the same keyword, and a notification instruction unit instructing to display the determined datacast information in a specified manner of notification if the comparison shows that the determined datacast information does not match the datacast information including the same keyword.

14 Claims, 9 Drawing Sheets

(51) Int. Cl.
*H04N 21/488* (2011.01)
*H04N 21/8405* (2011.01)

(56) References Cited

U.S. PATENT DOCUMENTS

| | | | |
|---|---|---|---|
| 2006/0136984 A1* | 6/2006 | Ohkita | H04H 40/18 725/137 |
| 2008/0127248 A1* | 5/2008 | Lin | H04N 7/165 725/32 |
| 2014/0281361 A1* | 9/2014 | Park | G06F 3/0641 711/206 |

* cited by examiner

Fig. 3

| No | DATE | TIME | CHANNEL | PROGRAM NAME | KEYWORD | TEXT |
|---|---|---|---|---|---|---|
| 00000001 | 2014/04/15 | 09:10 | 001 | MIDDAY NEWS | EARTHQUAKE | EARTHQUAKE OCCURRED AT HH:MM IN ... WITH ITS SEISMIC CENTER NEAR ... |
| 00000002 | 2014/04/15 | 09:20 | 005 | MUSIC PROGRAM | TERROR | A TERROR FOR INDEPENDENCE OCCURRED IN ... AREA IN ... |
| .. | .. | .. | .. | .. | .. | .. |
| .. | .. | .. | .. | .. | .. | .. |
| .. | .. | .. | .. | .. | : | .. |

107

DATACAST INFORMATION CONTROLLER, DATACAST INFORMATION DISPLAY SYSTEM, DATACAST INFORMATION CONTROL METHOD AND COMPUTER-READABLE RECORDING MEDIUM

This application is based upon and claims the benefit of priority from Japanese Patent Application No. 2014-117754, filed on Jun. 6, 2014, the disclosure of which is incorporated herein in its entirety by reference.

TECHNICAL FIELD

The present invention relates to datacast information controller and the like that perform control so as to display one or more received contents of datacasting according to the request from a user.

BACKGROUND ART

BS (Broadcasting Satellite) digital broadcasting, CS (Communications Satellite) broadcasting, terrestrial digital broadcasting and the like deliver video-audio signals and datacast information simultaneously. In datacasting, a character code, graphics information and other information are multiplexed with (superimposed on) video-audio signals. As a type of datacasting, there are broad-cast-program supplemental datacasting for supplementing information about a program being broadcasted, independent datacasting that is not tied to a broadcast program, or the like. Since these types of datacasting are transmitted from broadcast stations in one direction, a user does not know which broadcast station transmits, when, and what kind of information is transmitted. Further, when a user wants to view desired information in datacasting, the user needs to manually switch the channels of broadcast stations and search for the desired information from among datacast information displayed on a television screen.

PTL 1 (Japanese Laid-open Patent Publication No. 2009-296418) discloses a technique in which datacast information such as news or urgent information that a user presets and wants to display is displayed on the foreground of a television picture while the user is watching the television. Further, PTL 2 (Japanese Laid-open Patent Publication No. 2013-223093) discloses a technique relating to a displaying method of datacasting. PTL 3 (Japanese Laid-open Patent Publication No. 2006-033574) discloses a technique relating to a recording method of datacasting.

In the techniques disclosed in PTL 1 and PTL 2, datacast information displayed on the foreground of a television picture is limited to a datacast from a broadcast station from which a user is currently viewing. Accordingly, when information that a user wants is included in a datacast from a broadcast station from which the user is not viewing, the user cannot know the fact. The technique disclosed in PTL 3 relates to recording processing of a broadcast program that includes a predetermined keyword in a predetermined time period and a technique for displaying a datacast relating to television pictures currently being viewed is not disclosed in PTL 3.

The present invention has been made in order to solve the problems described above. An object of the present invention is to provide a datacast information controller and the like capable of searching for information that a user wants to view from among datacast information from one or more receivable broadcast stations, and presenting searched information to a user in a way desired by a user.

SUMMARY

To solve the problem, a first aspect of the present invention is a datacast information controller including a content storage unit storing datacast information obtained by splitting a broadcast radio wave, a keyword comparison unit determining whether the datacast information acquired from the content storage unit includes a specified keyword, a broadcast information storage unit storing datacast information that includes a keyword detected beforehand, a broadcast information comparison unit comparing datacast information determined to include a keyword with datacast information that includes the same keyword as the keyword stored in the broadcast information storage unit, and a notification instruction unit instructing to display the datacast information determined to include a keyword in a specified manner of notification if the comparison shows that the datacast information determined to include the keyword does not match the datacast information including the same keyword.

A second aspect of the present invention is a datacast information display system including the datacast information controller described above, the display unit, and the datacast information display device, wherein the display unit is a display unit included in a television device connected to the datacast information controller, and the datacast information display device is a device which is connected to the datacast information controller and is capable of displaying at least the datacast information.

A third aspect of the present invention is a datacast information control method including storing datacast information obtained by splitting a broadcast radio wave in a content storage unit, determining whether the datacast information acquired from the content storage unit includes a specified keyword, storing datacast information that includes a keyword detected beforehand in a broadcast information storage unit, comparing datacast information determined to include a keyword with datacast information that includes the same keyword as the keyword stored in the broadcast information storage unit, and instructing to display the datacast information determined to include a keyword in a specified manner of notification if the comparison shows that the datacast information determined to include the keyword does not match the datacast information including the same keyword.

A fourth aspect of the present invention is a non-transitory computer-readable recording medium storing a datacast information control program for causing a computer to implement the functions of storing datacast information obtained by splitting a broadcast radio wave in a content storage unit, determining whether the datacast information acquired from the content storage unit includes a specified keyword, storing datacast information that includes the keyword detected beforehand in a broadcast information storage unit, comparing datacast information determined to include a keyword with datacast information that includes the same keyword as the keyword stored in the broadcast information storage unit, and instructing to display the datacast information determined to include a keyword in a specified manner of notification if the comparison shows that the datacast information determined to include the keyword does not match the datacast information including the same keyword.

According to the present invention, the information that a user wants to view can be searched from among the datacast information from one or more receivable broadcast stations, and the searched information can be presented in a way desired by a user.

BRIEF DESCRIPTION OF THE DRAWINGS

Exemplary features and advantages of the present invention will become apparent from the following detailed description when taken with the accompanying drawings in which:

FIG. 3 is a diagram illustrating an exemplary structure of internal data in a broadcast information storage unit of the datacast information controller according to the first exemplary embodiment of the present invention;

EXEMPLARY EMBODIMENT

Exemplary Embodiment

Figure 1:
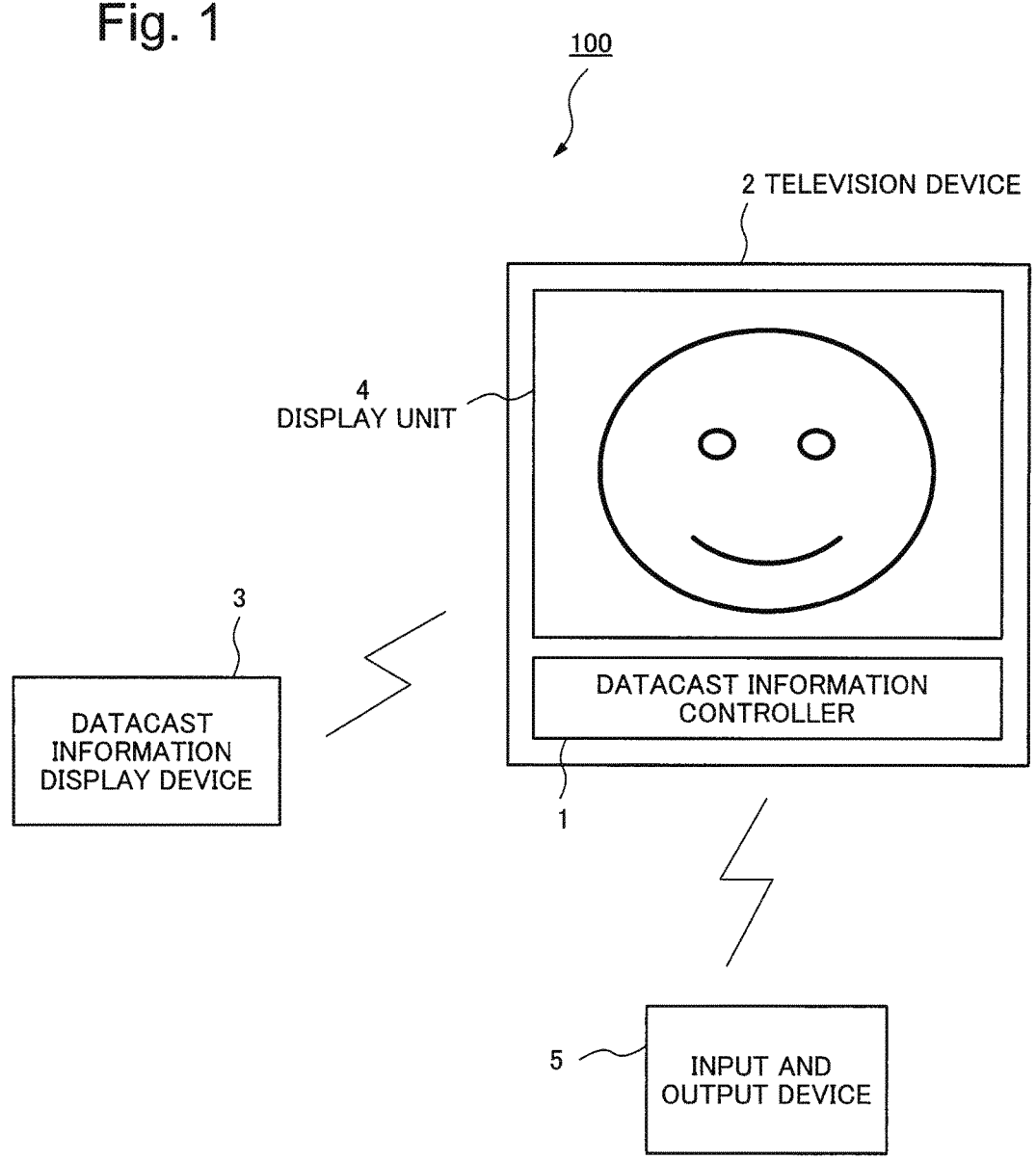
FIG. 1 is a diagram illustrating an exemplary configuration of a datacast information display system according to a first exemplary embodiment of the present invention.

Next, a detailed explanation will be given for exemplary embodiments with reference to the drawings. Same or similar elements are given same or similar reference numerals throughout the drawings and the following description. Note that the drawings schematically illustrate configurations in exemplary embodiments of the present invention. Further, each exemplary embodiment of the present invention described below shows an exemplary case and modifications can be made appropriately within essentially the same scope of the present invention.

First Exemplary Embodiment (Datacast Information Display System)

A datacast information display system 100 according to a first exemplary embodiment includes a television device 2, a datacast information display device 3 and an input and output device 5 as illustrated in FIG. 1. The television device 2 includes a datacast information controller 1 and a display unit 4.

The television device 2 includes the same configuration as a typical television device and is capable of receiving radio waves of digital broadcasting such as BS digital broadcasting, CS broadcasting, and terrestrial digital broadcasting, demodulating the received radio waves, and displaying information of television pictures and datacasts. The display unit 4 displays television pictures and datacasts.

The datacast information display device 3 is a monitor that displays datacast information that a user wants to be notified, for example, urgent news or train delay information. The datacast information display device 3 may be any device that includes at least an image displaying area in which datacast information that a user wants to be notified can be displayed. For example, the datacast information display device 3 may be a display device to be used with a personal computer, a display device to be installed in the street for advertisement, a typical television device, or a mobile communication terminal equipped with a monitor (such as a tablet terminal or a smartphone). Alternatively, the datacast information display device 3 may be a dedicated monitor device developed for the datacast information display system 100. Note that a plurality of such datacast information display devices 3 may exist in the datacast information display system 100.

The input and output device 5 is a device for inputting a keyword of information that a user wants to view and the manner of notification of the keyword. The input and output device 5 is a device that can be connected to the datacast information controller 1 through wired communication or radio communication and is equipped with a keyboard, push buttons, a touch panel and the like. Specifically, the input and output device 5 may be a remote control for the television device 2, a user's personal computer, or a mobile communication terminal. The input and output device 5 may be the datacast information display device 3.

The datacast information controller 1 receives all items of datacast information that relates to digital broadcasts received by the television device 2 and, if the items of information include an item of information that a user wants to be notified, the item of information is displayed on at least either the display unit 4 of the television device 2 or the datacast information display device 3. The datacast information controller 1 is included in the television device 2 in FIG. 1 or may be provided outside of the television device 2, in a manner connectable to the television device 2. The datacast information controller 1 is connected to the datacast information display device 3 through wired communication, radio communication or a communication line that is an appropriate combination thereof. The datacast information controller 1 sends information that a user wants to be notified to the datacast information display device 3.

(Datacast Information Controller)

Figure 2:
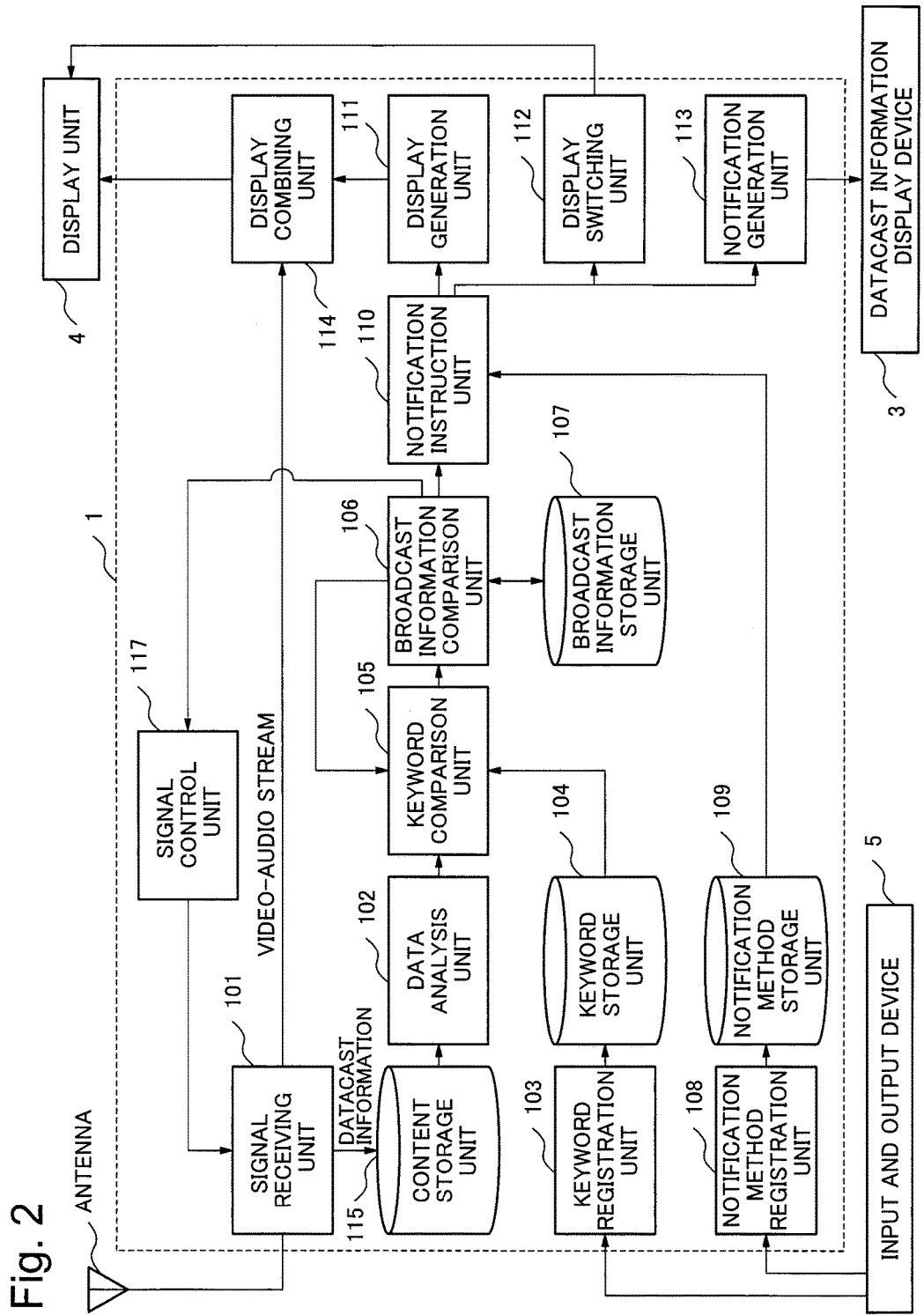
FIG. 2 is a diagram illustrating an exemplary configuration of a datacast information controller according to the first exemplary embodiment of the present invention.

As illustrated in FIG. 2, the datacast information controller 1 includes a signal receiving unit 101, a data analysis unit 102, a keyword registration unit 103, a keyword storage unit 104, a keyword comparison unit 105, a broadcast information comparison unit 106, a broadcast information storage unit 107, a notification method registration unit 108, a notification method storage unit 109, a notification instruction unit 110, a display generation unit 111, a display switching unit 112, a notification generation unit 113, a display combining unit 114, a content storage unit 115, and a signal control unit 117.

The signal receiving unit 101 receives a radio wave through an external antenna, demodulates the received radio wave, and splits information included in the demodulated signal into video, audio and datacast information. The signal receiving unit 101 sends the split video and audio to the display combining unit 114 as a video-audio stream. The signal receiving unit 101 sends the split datacast information to the content storage unit 115. The content storage unit 115 temporarily stores the received datacast information. In the datacasting, the same broadcast content is periodically transmitted in the form of a file by carousel transmission method. Contents of datacasting are stored in the content storage unit 115 as content files.

When completing storage of an entire file required for displaying a content in the content storage unit 115, the data analysis unit 102 acquires the file and performs processing for extracting a text from a datacast information content written in BML (Broadcast Markup Language) format in the file. In this processing, the data analysis unit 102 performs the so-called crawling processing in which an operation of following a link included in the extracted text and further extracting another text is repeated. Note that the data analysis unit 102 temporarily stores a text extracted previously through the crawling. The data analysis unit 102 then compares the extracted text with the text extracted previously to analyze whether there is a difference between the texts. This is performed because exactly the same content can be periodically transmitted by carousel transmission method in datacasting.

The keyword registration unit 103 acquires a keyword specified by a user through the input and output device 5. In other words, the keyword registration unit 103 acquires a keyword that a user wants to detect (wants to be notified) from datacasts and stores the acquired keyword in the keyword storage unit 104. Under this circumstance, the keyword registration unit 103 may acquire and register information associated with the keyword, for example, information such as the broadcast stations, time period, or a program genre in which the keyword is searched for. For example, the associated information can be combined with the keyword, like "keyword: world affairs, broadcast stations: NHK <ch (channel) 1, ch 2> and TBS <ch 6>, time period: 19:00-22:00, program genre: news program". Note that some of these items of associated information may be combined with the keyword.

The keyword storage unit 104 stores a keyword specified by a user. The keyword storage unit 104 may register a keyword (such as a broadcast station, a time period or a program genre) associated with the specified keyword along with the specified keyword.

The keyword comparison unit 105 compares a text received from the data analysis unit 102 with a keyword acquired from the keyword storage unit 104.

The broadcast information storage unit 107 stores texts including a keyword detected in the past and information associated with the texts. Specifically, the broadcast information storage unit 107 sores information such as acquisition numbers, acquisition dates, acquisition times, acquisition channels (broadcast stations), program names, keywords and texts in association with one another as a database as illustrated in FIG. 3.

The broadcast information comparison unit 106 receives a text including a keyword from the keyword comparison unit 105 and compares the received text with a text that is stored in the broadcast information storage unit 107 and in which the keyword was detected in the past to determine whether or not they match each other. If the comparison shows that the contents of the texts differ from each other, the broadcast information comparison unit 106 sends the text received from the keyword comparison unit 105 to the notification instruction unit 110. The broadcast information comparison unit 106 stores the received text in the broadcast information storage unit 107. If the comparison shows that the contents of the texts thereof are the same, the broadcast information comparison unit 106 discards the received text. This is because the same content can be broadcasted by many broadcast stations, such as in news programs, and it may be redundant to notify all of those texts to a user. Note that the option of selecting displaying of all such texts may be provided to a user. In that case, the datacast information display device 3 or the display unit 4, which will be described later, displays texts from all of the broadcast stations.

The notification method registration unit 108 prompts a user to select a manner of notification of a detected result when a text including a keyword is detected. The selection is made through the input and output device 5. The manner of notification selected by the user is stored in the notification method storage unit 109. Notification method options, such as "1. Display on the television screen", "2. Change from the broadcast station from which a user is currently viewing to the broadcast station broadcasting a text including the keyword", and "3. Display on the datacast information display device", may be presented to a user to allow the user to select one or more. Note that when "1. Display on the television screen" is selected, options from which the user can select displaying a superimposed text or a pop-up display may be provided.

The notification method storage unit 109 stores a user-selected manner of notification of texts including a keyword.

The notification instruction unit 110 acquires the manner of notification desired by a user from the notification method storage unit 109 and sends text information provided from the broadcast information comparison unit 106 and information about the broadcast station that is the source of the information to at least one or more of the display generation unit 111, the display switching unit 112, and the notification generation unit 113 according to the manner of notification.

The display generation unit 111 receives a text from the notification instruction unit 110, generates display information for displaying the received text on the display unit 4, and sends the generated display information to the display combining unit 114.

The display switching unit 112 receives information about the broadcast station that transmits a text from the notification instruction unit 110, generates control information for switching an video-audio stream to be displayed on the display unit 4 to the broadcast station received information, and sends the control information to the display unit 4. If the display unit 4 is in the power-off state at this point in time, the display switching unit 112 also sends information for powering on the display unit 4 to the display unit 4.

The notification generation unit 113 receives a text from the notification instruction unit 110, generates display information for displaying the received text on the datacast information display device 3 and sends the generated display information to the datacast information display device 3.

The display combining unit 114 combines video-audio stream data received from the signal receiving unit 101 and text information received from the display generation unit 111 to generate datacast screen data and sends the generated datacast screen data to the display unit 4.

The display unit 4 displays datacast screen data received from the display combining unit 114. Alternatively, the display unit 4 switches a video-audio stream channel to the broadcast station transmitting a text in accordance with control information received from the display switching unit 112 and displays information including the text of the datacast of the broadcast station (datacast screen data).

The signal control unit 117 switches a broadcasting channel to be received by the signal receiving unit 101. Specifically, the signal control unit 117 controls the signal receiving unit 101 to tune to a broadcast station to obtain a datacast from among broadcast stations from which radio wave are being received and controls the timing of switching the broadcast stations to receive radio waves. Switching to another broadcast station is made when comparison of all texts in datacast information from a certain broadcast station at the broadcast information comparison unit 106 is completed and the signal control unit 117 receives the notification of the completion. Alternatively, timer functionality may be provided in the signal control unit 117 and switching may be made from one broadcast station to another at predetermined time intervals (for example, every three minutes). Basically, switching from one broadcast station to another is made in the order in which the broadcast station can be easily tuned next (i.e. from the current broadcast station to the broadcast station having the physical channel value that is closest to the channel value of the current broadcast station, for example, in the order of channel 27, channel 26, channel 25 and the like). When not all broadcast stations but some broadcast stations are specified by a user, and there are a plurality of broadcast stations, switching from one broadcast station to another is made in the order in which the broadcast station to be switched next has the physical channel value closest to the physical channel value of the already received broadcast station.

(Operation of Datacast Information Display System)

Figure 4:
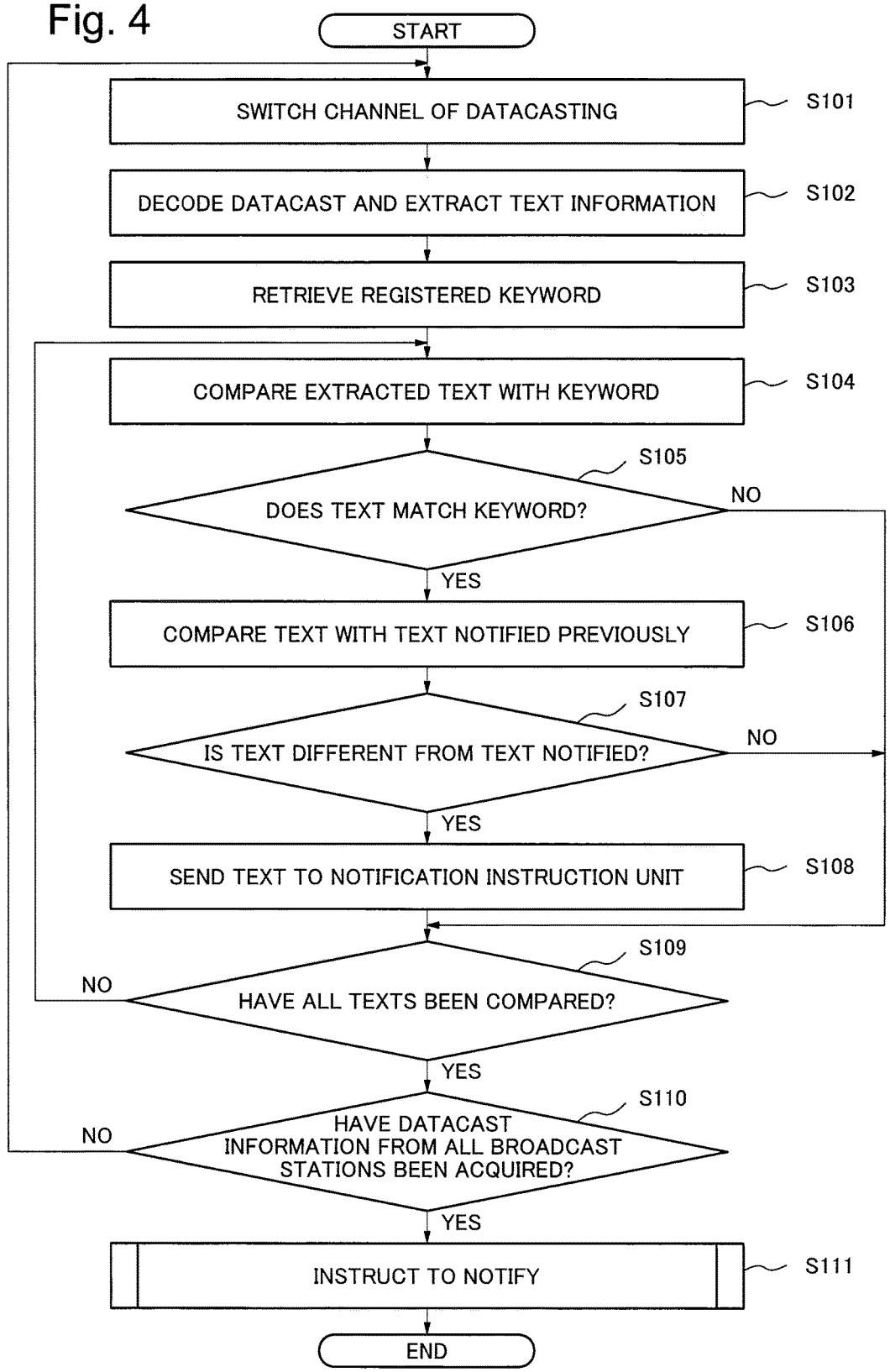
FIG. 4 is a flowchart illustrating an exemplary operation of the datacast information controller according to the first exemplary embodiment.

An operation of the datacast information display system 100 including the datacast information controller 1 will now be described with reference to a flowchart illustrated in FIG. 4.

At step S101, the signal receiving unit 101 receives a radio wave through the external antenna. The control unit 117 controls the signal receiving unit 101 so as to receive a radio wave from a broadcast station (channel) to be received. The signal receiving unit 101 demodulates the radio wave received from the broadcast station specified by the signal control unit 117 and splits information included in the demodulated signal into video, audio and datacast information. The signal receiving unit 101 sends the split video and audio to the display combining unit 114 as a video-audio stream. The signal receiving unit 101 stores the split datacast information in the content storage unit 115.

When completing the storage of an entire file required for displaying a content in the content storage unit 115, the data analysis unit 102 acquires the file and extracts a text from a datacast information content written in BML format in the file at step S102. In this processing, the data analysis unit 102 performs the so-called crawling in which an operation of following a link included in the extracted text and further extracting another text is repeated. The data analysis unit 102 then compares the extracted text with the text extracted previously to analyze whether there is a difference between the texts. This is performed because exactly the same content can be periodically transmitted by carousel transmission method in datacasting. If the analysis shows that there is a difference, the data analysis unit 102 sends the extracted text to the keyword comparison unit 105. If the analysis shows that there is not a difference, the data analysis unit 102 discards the extracted text.

At step S103, the keyword comparison unit 105 acquires a keyword from the keyword storage unit 104. A keyword registered by a user beforehand through the keyword registration unit 103 that the user wants to detect (to be notified) from datacasts is stored in the keyword storage unit 104.

At step S104, the keyword comparison unit 105 compares the text received from the data analysis unit 102 with the keyword acquired from the keyword storage unit 104.

If the comparison shows that the received text includes the keyword at step S105, the keyword comparison unit 105 sends the text to the broadcast information comparison unit 106 and the processing proceeds to step S106. If the comparison shows that the received text does not include the keyword, the keyword comparison unit 105 discards the text and the processing proceeds to step S109.

At step S106, the broadcast information comparison unit 106 receives the text including a keyword from the keyword comparison unit 105, compares the received text with a text that is stored in the broadcast information storage unit 107 and in which the keyword was detected in the past to determine whether or not they match each other.

If the comparison shows that the contents of the texts differ from each other at step S107, the broadcast comparison unit 106 sends the received text to the notification instruction unit 110 at step S108. The broadcast information comparison unit 106 stores the text in the broadcast information storage unit 107. On the other hand, if the comparison shows that the contents of the texts are identical, the broadcast information comparison unit 106 discards the received text and the processing proceeds to step S109. This is because the same content can be broadcasted by many broadcast stations, such as in news programs, and it may be redundant to notify all of those texts to a user.

At step S109, the broadcast information comparison unit 106 confirms whether or not all of the registered keywords are compared with all texts. If there is a text to be compared, the processing returns to step S104. If there is not a text to be compared, the processing proceeds to step S110.

At step S110, the broadcast information comparison unit 106 confirms whether or not all registered keywords and all texts from all broadcast stations are compared. If the comparison for all broadcast stations is completed, the processing proceeds to step S111. If the comparison for all broadcast stations is not completed, the processing returns to step S101, where the signal control unit 117 instructs the signal receiving unit 101 to switch to a broadcast station from which broadcast information is not received.

At step S111, the notification instruction unit 110 instructs to display the text that matches the keyword. The details will be described later. After completion of the instruction, the operation of this flowchart ends.

Figure 5:
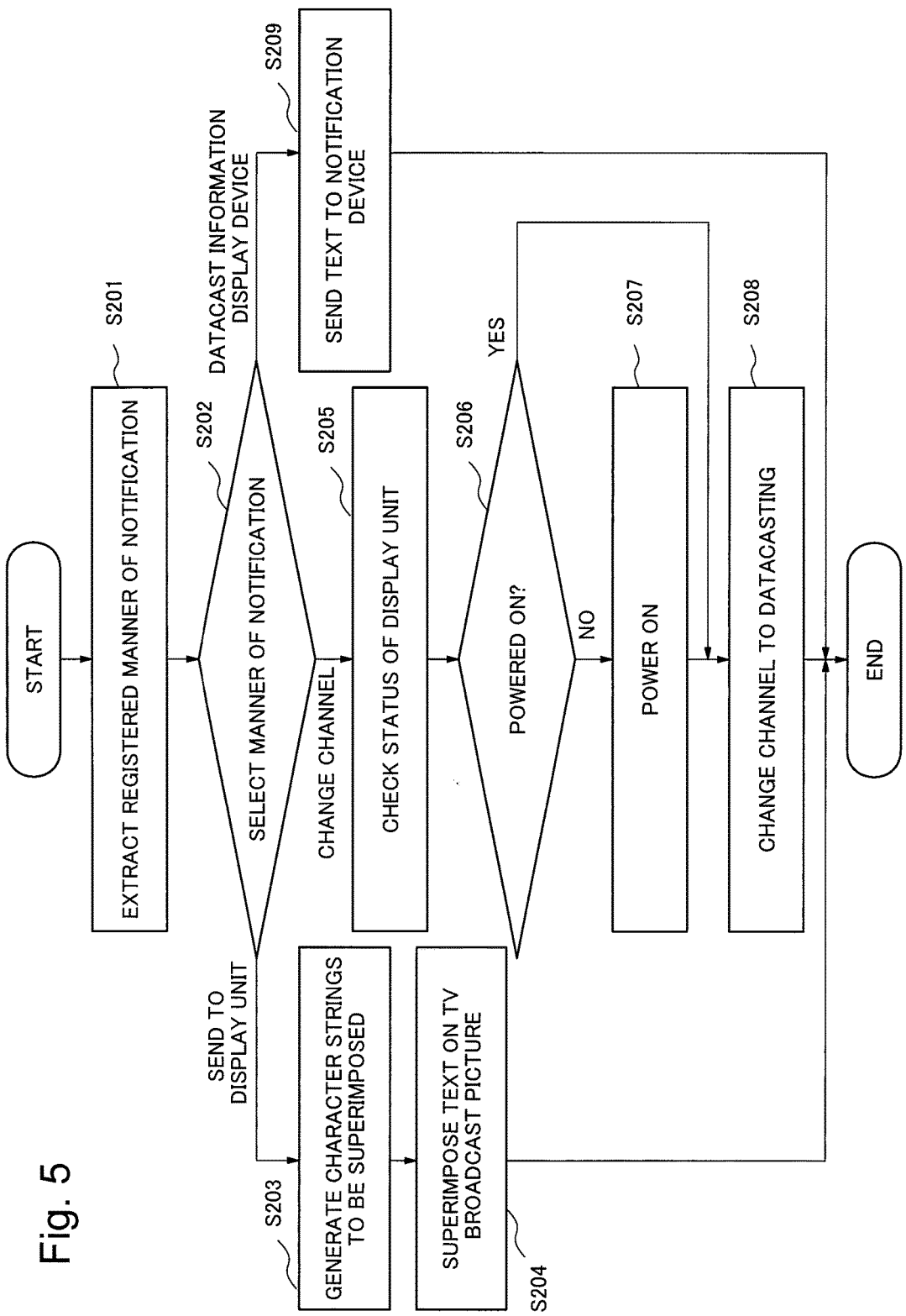
FIG. 5 is a flowchart illustrating an exemplary operation of the datacast information controller according to the first exemplary embodiment.

An operation of the notification instruction unit 110 at step S111 will be described next with reference to the flowchart illustrated in FIG. 5.

First, the notification instruction unit 110 acquires the manner of notification desired by a user from the notification method storage unit 109 at step S201 and sends the text information provided from the broadcast information comparison unit 106 and the broadcast station that is the source of the information to at least one or more of the display generation unit 111, the display switching unit 112, and the notification generation unit 113 according to the manner of notification. The notification method storage unit 109 stores a user-selected manner of notification in which the result of detection is notified when a text including a keyword is detected, which is acquired through the notification method registration unit 108.

If the selected manner of notification is "1. Display on the television screen" at step S202, the notification instruction unit 110 proceeds to processing of step S203. If the selected manner of notification is "2. Change from the broadcast station from which a user is currently viewing to the broadcast station broadcasting a text including the keyword", the notification instruction unit 110 proceeds to processing of step S205. If the selected manner of notification is "3. Display on the datacast information display device", the notification instruction unit 110 proceeds to processing of step S209.

At step S203, the notification instruction unit 110 sends text information to the display generation unit 111 since "1. Display on the television screen" is selected as a manner of notification. Options from which a user can select displaying the text as a superimposed text or a pop-up display on a video-audio stream display screen may be provided.

When the display generation unit 111 receives the text from the notification instruction unit 110, the display generation unit 111 generates display information for displaying the received text on the display unit 4 and sends the generated information to the display combining unit 114 at step S204. The display combining unit 114 combines a video-audio stream received from the signal receiving unit 101 with the text received from the display generation unit 111 to generate datacast screen data and sends the generated datacast screen data to the display unit 4. Any of currently well-known techniques can be used for combining (superimposing) a video-audio stream with a text at this step and therefore description of the procedure will be omitted herein.

At step S205, the notification instruction unit 110 checks status of the display unit 4. The notification instruction unit 110 sends the text and information about the broadcast station transmitting the text to the display switching unit 112 since "2. Change from the broadcast station from which a user is currently viewing to the broadcast station broadcasting a text including the keyword" is selected as a manner of notification.

At step S206, the display switching unit 112 checks to see whether the display unit 4 is powered on. If the display unit 4 is in the power-off state, the display switching unit 112 proceeds to processing of step S207 and turns on the display unit 4. If the display unit 4 is in the power-on state, the display switching unit 112 proceeds to processing of step S208.

At step S208, the display switching unit 112 checks to see whether the broadcast station from which a program is being broadcasted and displayed currently on the display unit 4 matches the broadcast station that is the source of the text information. If they match, the display switching unit 112 displays datacast information including the text without changing the broadcast station. If they do not match, the display switching unit 112 changes the channel to the broadcast station that is the source of the text information and displays datacast information including the text on a broadcast from the new broadcast station. The information is displayed in the manner specified by the user beforehand, such as in the form of a superimposed text or pop-up display.

At step S209, the notification instruction unit 110 sends the text to the notification generation unit 113 since "3. Display on the datacast information display device" is selected as a manner of notification. The notification generation unit 113 receives the text from the notification instruction unit 110, generates display information for displaying the received text on the datacast information display device 3, and sends the display information to the datacast information display device 3. The datacast information display device 3 displays the received text on the screen.

The datacast information controller 1 according to the first exemplary embodiment is capable of searching for information that a user wants to view from among datacast information from at least one or more receivable broadcast stations and presenting the searched information to the user in a manner desired by the user. The datacast information controller 1 prompts a user to register a keyword of information that the user wants to view beforehand and searches for information from among datacast information from one or more receivable broadcast stations on the basis of the registered keyword. This enables the user to view the information the user wants even if the information is included in a datacast from a broadcast station from which the user is not viewing or if the user temporality shuts down the video display on the television device 2. Further, the result of the search can be presented to the user in one or more manners desired by the user. This allows the user to readily view up-to-date information that the user wants at any time without manually switching datacasting from one broadcast station to another.

Further, the data analysis unit 102 discards the same content file received by carousel transmission method. The keyword comparison unit 105 discards texts (datacast information) that do not include the keyword. The broadcast information comparison unit 106 discards a text that includes the same keyword but has been already notified to the user. The discard of such text data can prevent redundant distribution of similar texts to the user.

Second Exemplary Embodiment (Datacast Information Display System)

Like the datacast information display system 100 of the first exemplary embodiment, a datacast information display system 200 according to a second exemplary embodiment includes a datacast information controller 11, a television device 2, a datacast information display device 3 and an input and output device 5. The television device 2 includes a display unit 4.

(Datacast Information Controller)

Figure 6:
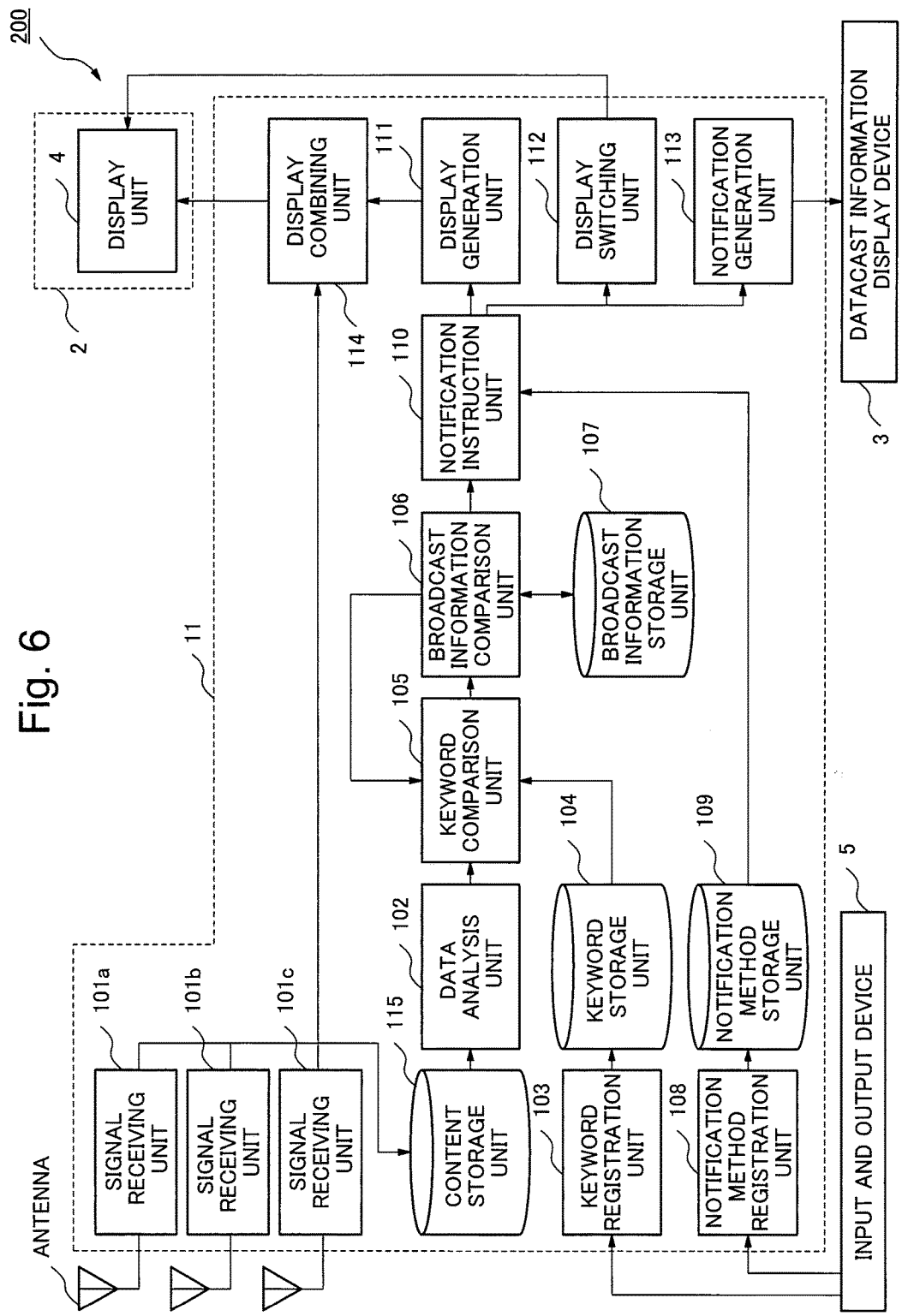
FIG. 6 is a diagram illustrating an exemplary configuration of a datacast information display system according to a second exemplary embodiment of the present invention.

As illustrated in FIG. 6, the datacast information controller 11 according to the second exemplary embodiment includes signal receiving units 101a, 101b and 101c, a data analysis unit 102, a keyword registration unit 103, a keyword storage unit 104, a keyword comparison unit 105, a broadcast information comparison unit 106, a broadcast information storage unit 107, a notification method registration unit 108, a notification method storage unit 109, a notification instruction unit 110, a display generation unit 111, a display switching unit 112, a notification generation unit 113, and a display combining unit 114.

The datacast information controller 11 includes a configuration that differs from the first exemplary embodiment in that the datacast information controller 11 includes as many antennas and signal receiving units 101a to 101c connected to the antennas as the number of the channels of broadcast stations from which datacasts are received. In other words, if a user wants to receive datacasts from all receivable broadcast stations, the datacast information controller 11 includes signal receiving units 101a to 101c for receiving datacasts from all of the broadcast stations. If a user selects one or more broadcast stations from which datacasts are received, instead of receiving datacasts from all receivable broadcast stations, as many signal receiving units 101a to 101c as the number of the selected broadcast stations are provided. To implement this, signal receiving units 101a to 101c datacasts from all broadcast stations may be provided beforehand before shipment. Alternatively, only a certain number of signal receiving units 101a to 101c, for example, only three signal receiving units 101a to 101c may be provided beforehand to allow a user to select the certain number of broadcast stations from among all broadcast stations. If a user wants to select more than the certain number of broadcast stations, signal receiving units 101a to 101c may be added afterwards. The types and numbers of datacast stations differ from country to country and region to region. In order to enable broadcasts from broadcast stations selected by a user to be received in any environments, any of the approaches described above may be used. Further, the datacast information controller 11 does not include a signal control unit 117. This is because the provision of as many signal receiving units 101a to 101c as the number of datacast stations selected by a user as described above eliminates the need for switching from one broadcast station to another.

Each of the signal receiving units 101a to 101c receives a radio wave from a predetermined broadcast station through an external antenna, demodulates the received radio wave, and splits the demodulated signal into video, audio and datacast information. Note that while there are three signal receiving units 101a to 101c in FIG. 6, this shows an exemplary case and there may be as many signal receiving units 101a to 101c as the number of broadcast stations from which datacasts are received. Each of the signal receiving units 101a to 101c receives different digital broadcasts from different broadcast stations. Each of the signal receiving units 101a to 101c sends the split video and audio to the display combining unit 114 as a video-audio stream. Each of the signal receiving units 110a to 110c temporarily stores the split datacast information in the content storage unit 115 as a content file. The other devices and units are the same as those of the first exemplary embodiments and therefore description of those devices and units will be omitted.

(Operation of Datacast Information Display System)

Figure 7:
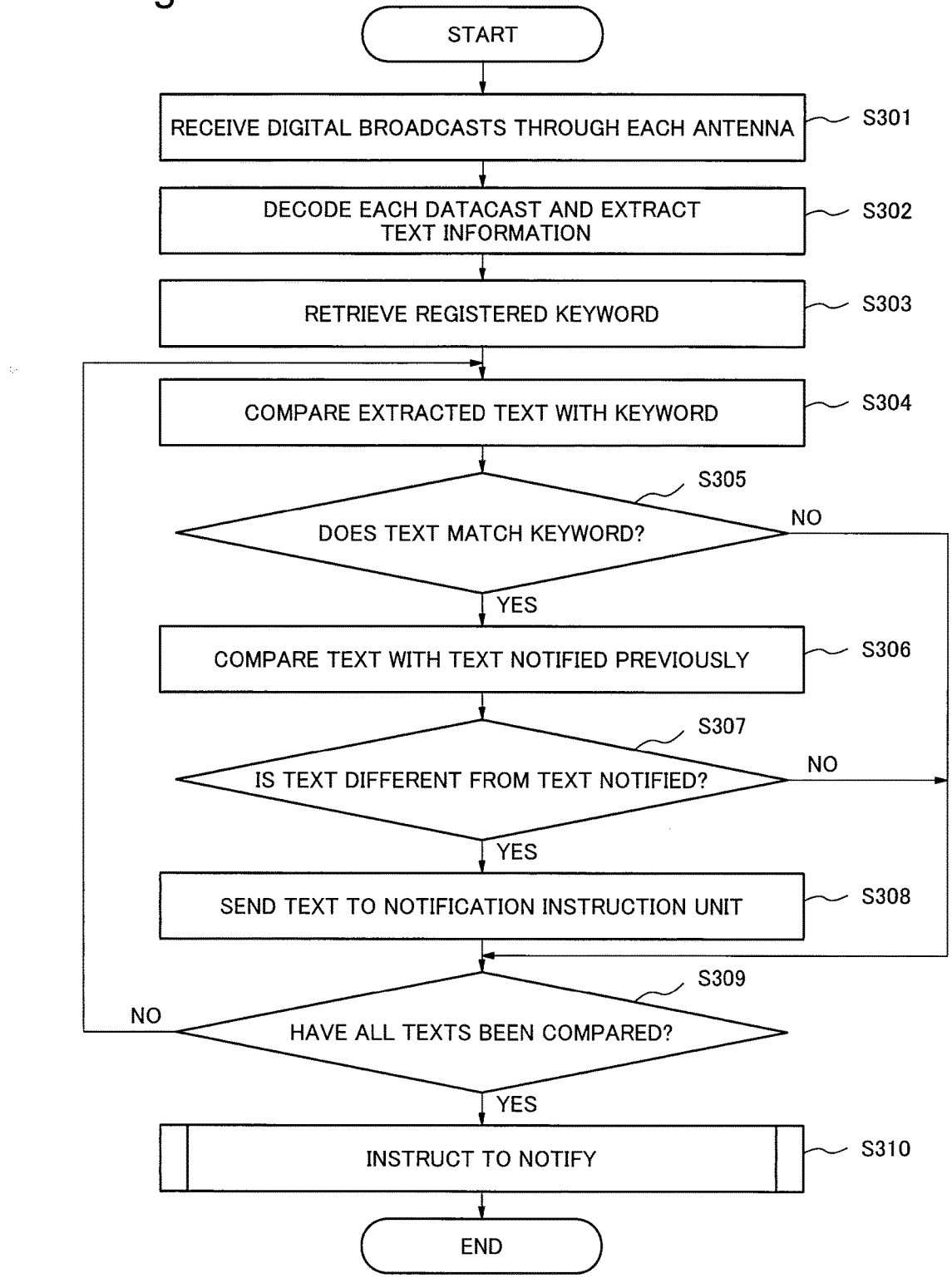
FIG. 7 is a flowchart illustrating an exemplary operation of the datacast information controller according to the second exemplary embodiment.

An operation of the datacast information display system 200 including the datacast information controller 11 will be described next with reference to the flowchart illustrated in FIG. 7. It is assumed in the following description that a user has already selected broadcast stations from which the user wants to receive broadcasts and the broadcast stations have been individually associated with their respective signal receiving units 101a to 101c.

At step S301, the signal receiving units 101a to 101c receive radio waves from different broadcast stations through the external antennas. Each of the signal receiving units 101a to 101c demodulates the received radio wave and splits information included in the demodulated signal into video, audio and datacast information. The signal receiving units 101a to 101c send the split video and audio to the display combining unit 114 as a video-audio stream. The signal receiving units 101a to 101c store the split datacast information in the content storage unit 115.

At step S302, the data analysis unit 102 extracts a text from the content storage unit 115. The data analysis unit 102 compares the extracted text with a text previously extracted to analyze whether there is a difference between the texts. If the analysis shows that there is a difference, the data analysis unit 102 sends the extracted text to the keyword comparison unit 105. If the analysis shows that there is not a difference, the data analysis unit 102 discards the extracted text.

At step S303, the keyword comparison unit 105 acquires a keyword from the keyword storage unit 104.

At step S304, the keyword comparison unit 105 compares the text received from the data analysis unit 102 with the keyword acquired from the keyword storage unit 104.

If the comparison shows that the received text includes the keyword at step S305, the keyword comparison unit 105 sends the text to the broadcast information comparison unit 106 and the processing proceeds to step S306. If the comparison shows that the received text does not include the keyword, the keyword comparison unit 105 discards the received text and the processing proceeds to step S309.

At step S306, the broadcast information comparison unit 106 receives the text including the keyword from the keyword comparison unit 105, compares the received text with a text that is stored in the broadcast information storage unit 107 and in which the keyword was detected in the past to determine whether or not they match each other.

If the comparison shows that the texts differ from each other at step S307, the broadcast information comparison unit 106 sends the received text to the notification instruction unit 110 at step S308. The broadcast information comparison unit 106 stores the text in the broadcast information storage unit 107. On the other hand, if the comparison shows that the texts are identical, the broadcast information comparison unit 106 discards the received text and the processing proceeds to step S309.

At step S309, the broadcast information comparison unit 106 confirms whether or not all of the registered keywords are compared with all texts. If there is a text to be compared, the processing returns to step S304. If there is not a text to be compared, the processing proceeds to step S310.

At step S310, the notification instruction unit 110 instructs to display the text that matches the keyword. After completion of the instruction, the operation in the flowchart ends.

Since details of the operation at step S310 are the same as the details of the operation at step S111 of the first exemplary embodiment (see steps S201 through 209 in FIG. 5), the description of step S310 will be omitted.

The datacast information controller 11 according to the second exemplary embodiment is capable of searching for information that a user wants to view from among datacast information from at least one or more receivable broadcast station and presenting the searched information to the user in a manner desired by the user. The datacast information controller 11 prompts a user to register a keyword of information that the user wants to view and a broadcast station from which the user wants to obtain the keyword beforehand, and searches for information from among datacast information from the broadcast stations from which the user wants to receive broadcasts on the basis of the registered keyword. This enables the user to view the information the user wants even if the information is included in a datacast from a broadcast station that the user is not viewing.

Further, the result of the search can be presented to a user in one or more manners desired by the user. This allows the user to readily view up-to-date information that the user wants at any time without manually switching datacasting from one broadcast station to another.

Furthermore, the datacast information controller 11 includes as many antennas and signal receiving units 101a to 101c as the number of broadcast stations from which datacasts are received. This can eliminate the need for control of switching between broadcast stations from which broadcasts are received.

Third Exemplary Embodiment (Datacast Information Controller)

Figure 8:
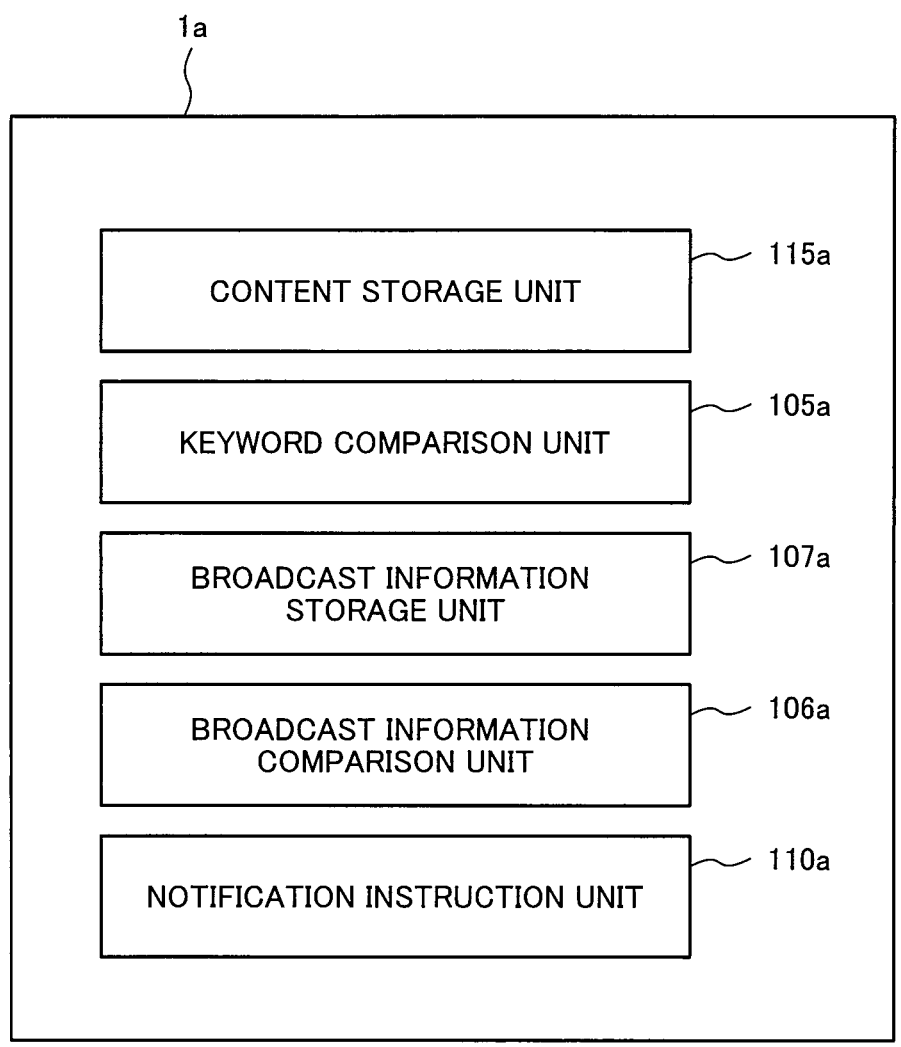
FIG. 8 is a diagram illustrating an exemplary configuration of a datacast information controller according to a third exemplary embodiment of the present invention.

A datacast information controller 1a according to a third exemplary embodiment of the present invention includes a content storage unit 115a, a keyword comparison unit 105a, a broadcast information storage unit 107a, a broadcast information comparison unit 106*a* and a notification instruction unit 110*a* as illustrated in FIG. 8.

The content storage unit 115*a* temporarily stores datacast information split into video, audio and datacast information.

The keyword comparison unit 105*a* determines whether or not datacast information acquired from the content storage unit 115*a* includes a keyword specified by a user.

The broadcast information storage unit 107*a* stores datacast information that includes a keyword detected in the past.

The broadcast information comparison unit 106*a* compares datacast information determined to include a keyword with datacast information including the same keyword as a keyword stored in the broadcast information storage unit 107*a*.

If the comparison described above shows that the two pieces of datacast information are different, the notification instruction unit 110*a* instructs to display the datacast information determined to include the keyword in a manner of notification specified by a user.

The datacast information controller 1*a* according to the third exemplary embodiment is capable of searching for information that a user wants to view from among datacast information from at least one or more receivable broadcast station and presenting the searched information to the user in a manner desired by the user. The datacast information controller 1*a* prompts the user to register a keyword of information that the user wants to view and a broadcast station from which the user wants to obtain the keyword beforehand, and searches for information from among datacast information from all of the broadcast stations from which the user wants to receive broadcasts for information on the basis of the registered keyword. This enables the user to view the information the user wants even if the information is included in a datacast from a broadcast station that the user is not viewing.

Note that each internal component of the datacast information controllers 1, 11, and 1*a* represents functional blocks and these functions may be implemented by hardware devices or may be implemented as function units of a program through an information processing device (computer). If an information processing device is used, at least the data analysis unit 102, the keyword registration unit 103, the keyword comparison unit 105, the broadcast information comparison unit 106, the notification method registration unit 108, the notification instruction unit 110, the display generation unit 111, the display switching unit 112, the notification generation unit 113, the display combining unit 114, and the signal control unit 117 among the components illustrated in FIGS. 2 and 6 can be treated as function (processing) units (software modules) of a software program. One exemplary hardware environment that can implement these functions (processing) will be described with reference to FIG. 9. However, the components are depicted as being separated as in the figure for convenience of explanation and various configurations may be conceivable.

Figure 9:
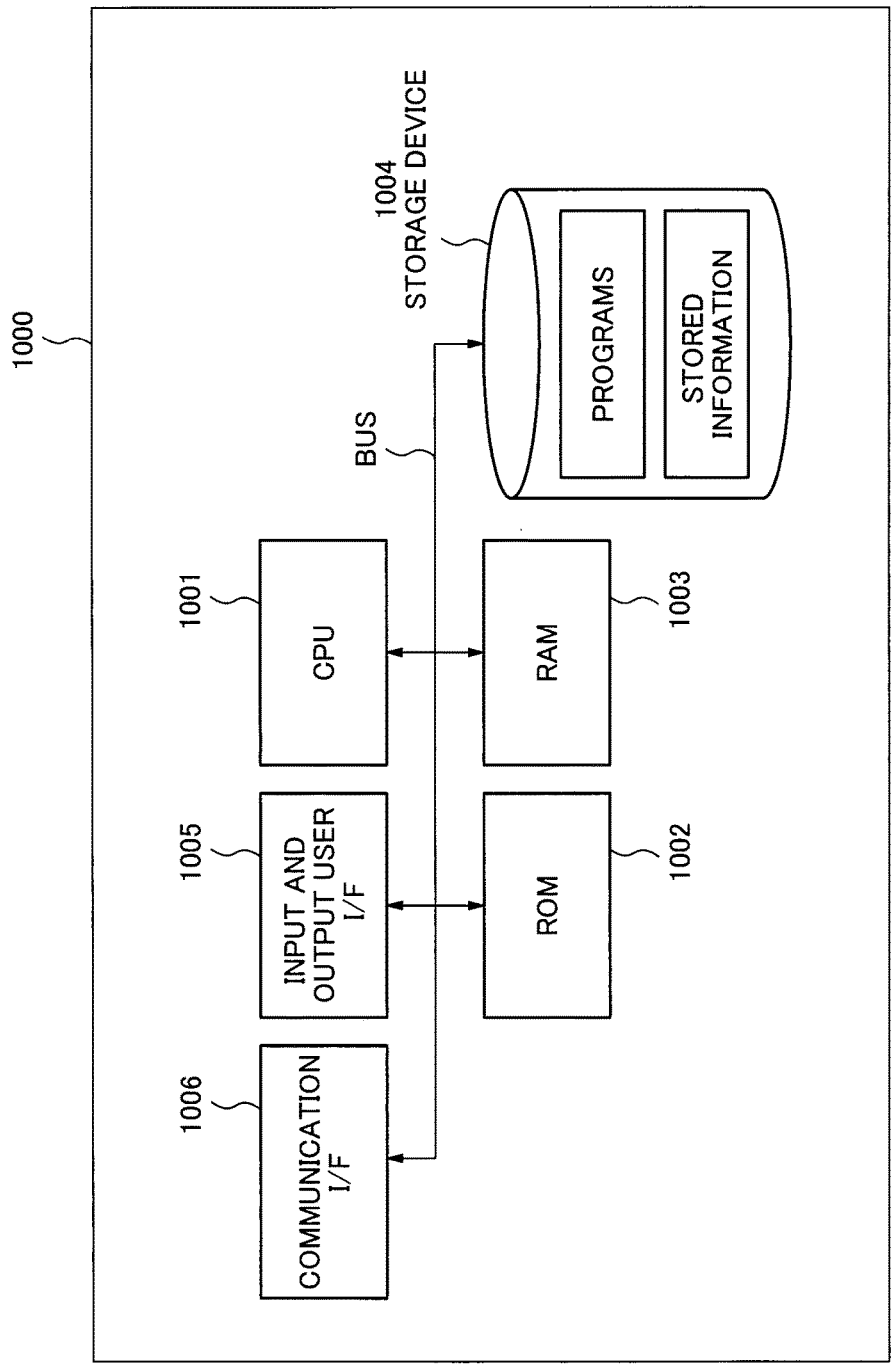
FIG. 9 is a diagram illustrating an exemplary computer configuration of the datacast information controllers according to the first to third exemplary embodiments of the present invention.

FIG. 9 is a diagram describing an exemplary configuration of an information processing device 1000 capable of implementing the datacast information controllers 1, 11, and 1*a* according to the exemplary embodiments of the present invention.

The information processing apparatus 1000 illustrated in FIG. 9 is a typical computer with which the following components are interconnected through a bus (communication line).

CPU (Central Processing Unit) 1001,
ROM (Read Only Memory) 1002,
RAM (Random Access Memory) 1003,
Storage device 1004,
Input and output user interface (hereinafter abbreviated as I/F) 1005, and
Communication I/F 1006 for communication with external devices The input and output user I/F 1005 is equivalent to the input and output device 5 illustrated in FIGS. 2 and 6. The communication I/F 1006 is equivalent to the signal control unit 101, the datacast information display device 3 and the display unit 4 illustrated in FIGS. 2 and 6.

The exemplary embodiments described above are achieved by the following procedure in the hardware environment described above. In other words, a computer program that can implement the functions in block diagrams (FIGS. 2, 6 and 8) or the flowcharts (FIGS. 4, 5 and 7) referred to in the descriptions of the exemplary embodiments is provided to the information processing apparatus 1000 illustrated in FIG. 9. Then, the computer program is read and interpreted by the CPU of the hardware and executed in the CPU. The computer program provided to the device may be stored in a readable and writable volatile memory (RAM) or nonvolatile memory device such as the storage device.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

REFERENCE SIGNS LIST

1 . . . Datacast information controller
1*a* . . . Datacast information controller
2 . . . Television device
3 . . . Datacast information display device
4 . . . Display unit
5 . . . Input and output device
11 . . . Datacast information controller
100 . . . Datacast information display system
101 . . . Signal receiving unit
101*a* . . . Signal receiving unit
101*b* . . . Signal receiving unit
101*c* . . . Signal receiving unit
102 . . . Data analysis unit
103 . . . Keyword registration unit
104 . . . Keyword storage unit
105 . . . Keyword comparison unit
105*a* . . . Keyword comparison unit
106 . . . Broadcast information comparison unit
106*a* . . . Broadcast information comparison unit
107 . . . Broadcast information storage unit
107*a* . . . Broadcast information storage unit
108 . . . Notification method registration unit
109 . . . Notification method storage unit
110 . . . Notification instruction unit
110*a* . . . Notification instruction unit
111 . . . Display generation unit 112 . . . Display switching unit
113 . . . Notification generation unit
114 . . . Display combining unit
115 . . . Content storage unit
115a . . . Content storage unit
117 . . . Signal control unit
200 . . . Datacast information display system
1000 . . . Information processing apparatus

The invention claimed is:

1. A datacast information controller comprising:
a memory storing instructions,
content storage storing datacast information obtained by splitting a broadcast radio wave and
datacast information storage storing the datacast information that includes keywords detected beforehand; and
at least one processor configured to process the instructions to:
determine whether the datacast information acquired from the content storage includes a specified keyword;
compare datacast information determined to include the keyword with datacast information that is stored in the datacast information storage and includes the same keyword as the keyword; and
instruct to display the datacast information determined to include the keyword in a specified manner of notification if the comparison shows that the datacast information determined to include the keyword does not match the datacast information including the same keyword;
a datacast information display device, wherein if the specified manner of notification is to display on the datacast information display device, the datacast information determined to include the keyword is provided to the datacast information display device,
wherein the at least one processor is configure to process the instructions to further extract a difference between current datacast information acquired from the content storage and prior datacast information acquired from the content storage prior to the acquisition of the current datacast information and,
if the extraction shows that there is the difference, select the prior datacast information as a candidate for the datacast information to be displayed.

2. The datacast information controller according to claim 1, wherein the at least one processor is configure to process the instructions to further transform the datacast information for displaying in a portion of a display display device,
wherein if the specified manner of notification is to display in a portion of the display display device, the datacast information determined to include the keyword is provided.

3. The datacast information controller according to claim 1, wherein the at least one processor is configure to process the instructions to further switch a broadcast station channel for displaying on a display device,
wherein if the specified manner of notification is to display as a datacast on the display device, datacast information determined to include the keyword is provided.

4. The datacast information controller according to claim 1, wherein the at least one processor is configure to process the instructions to further:
receive the broadcast radio wave and splitting the received broadcast radio wave into video, audio and datacast information; and
control reception of the broadcast radio wave;

a broadcast station of the broadcast radio wave to be received is switched in accordance with the control.

5. The datacast information controller according to claim 1, wherein the at least one processor is configure to process the instructions to further receive the broadcast radio wave and split the received broadcast radio wave into video, audio and datacast information,
wherein the broadcast radio waves are received from different broadcast stations.

6. A datacast information display system comprising:
the datacast information controller according to claim 1;
a display unit; and
a datacast information display device;
wherein the display unit is a display unit included in a television device connected to the datacast information controller; and
the datacast information display device is a device which is connected to the datacast information controller and is capable of displaying at least the datacast information.

7. A datacast information control method comprising:
storing datacast information obtained by splitting a broadcast radio wave in a content storage unit;
determining whether the datacast information acquired from the content storage unit includes a specified keyword;
storing datacast information that includes the keyword detected beforehand in a broadcast information storage unit;
comparing datacast information determined to include the keyword with datacast information that is stored in the broadcast information storage unit and includes the same keyword as the keyword;
instructing a display unit to display the datacast information determined to include the keyword in a specified manner of notification if the comparison shows that the datacast information determined to include the keyword does not match the datacast information including the same keyword,
wherein a datacast information display device connected to a device on which the datacast information control method is performed is further provided;
in the instructing, if the specified manner of notification is to display on the display unit, the datacast information determined to include the keyword is provided to the datacast information display device;
extracting a difference between current datacast information acquired from the content storage unit and prior datacast information acquired from the content storage unit prior to the acquisition of the current datacast information; and
if the extraction shows that there is the difference, selecting the prior datacast information as a candidate for the datacast information to be displayed.

8. The datacast information control method according to claim 7, further comprising transforming the datacast information for displaying in a portion of a display unit,
wherein, in the instructing, if the specified manner of notification is to display in a portion of the display unit, the transformation is performed to include the datacast information determined to include keyword.

9. The datacast information control method according to claim 7, further comprising switching a broadcast station channel for displaying on the display unit,
wherein, in the instructing, if the specified manner of notification is to display as a datacast on the display unit, the switching is made on the basis of the datacast information determined to include the keyword.

10. The datacast information control method according to claim 7, further comprising:
receiving the broadcast radio wave and splitting the received broadcast radio wave into video, audio and datacast information; and
controlling reception of the broadcast radio wave;
wherein a broadcast station of the broadcast radio wave to be received is switched in accordance with the control.

11. A non-transitory computer-readable recording medium storing a datacast information control program causing a computer to implement the functions of:
storing datacast information obtained by splitting a broadcast radio wave in a content storage unit;
determining whether the datacast information acquired from the content storage unit includes a specified keyword;
storing datacast information that includes the keyword detected beforehand in a broadcast information storage unit;
comparing datacast information determined to include the keyword with datacast information that is stored in the broadcast information storage unit and includes the same keyword as the keyword;
instructing to display the datacast information determined to include the keyword in a specified manner of notification if the comparison shows that the datacast information determined to include the keyword does not match the datacast information including the same keyword,
wherein the computer further includes a datacast information display device connected to the computer; and
in the function of instructing, if the specified manner of notification is to display on the display unit, the datacast information determined to include the keyword is provided to the datacast information display device;
extracting a difference between current datacast information acquired from the content storage unit and prior datacast information acquired from the content storage unit prior to the acquisition of the current datacast information; and
if the extraction shows that there is the difference, selecting the prior datacast information as a candidate for the datacast information to be displayed.

12. The recording medium according to claim 11, further comprising the function of transforming the datacast information for displaying in a portion of a display unit,
wherein, in the function of instructing, if the specified manner of notification is to display in a portion of the display unit, the datacast information determined to include the keyword is provided to the function of transforming.

13. The recording medium according to claim 11, further comprising the function of switching a broadcast station channel for displaying on the display unit,
wherein, in the function of instructing, if the specified manner of notification is to display as a datacast on the display unit, the datacast information determined to include the keyword is provided to the function of switching.

14. The recording medium according to claim 11, further comprising the functions of:
receiving the broadcast radio wave and splitting the received broadcast radio wave into video, audio and datacast information; and
controlling reception of the broadcast radio wave;
wherein a broadcast station of the broadcast radio wave to be received is switched in accordance with the function of controlling.

* * * * *